United States Patent [19]
Greenwood, David

[11] Patent Number: 4,777,248
[45] Date of Patent: Oct. 11, 1988

[54] WATER-SOLUBLE NON-REACTIVE TRIAZINYL MONO-AZO DYE FOR INK JET PRINTING

[75] Inventor: Greenwood, David, Oldham, England

[73] Assignee: Imperial Chemical Industries PLC, London, England

[21] Appl. No.: 813,777

[22] Filed: Dec. 27, 1985

[30] Foreign Application Priority Data

Jan. 8, 1985 [GB] United Kingdom ............... 8500409
Mar. 21, 1985 [GB] United Kingdom ............... 8507311

[51] Int. Cl.$^4$ .................. C09B 62/04; C09D 11/02
[52] U.S. Cl. ........................ 534/803; 106/20; 106/22; 534/729; 534/751
[58] Field of Search ............... 106/20, 22; 534/803, 534/729, 751; 346/1.1

[56] References Cited

U.S. PATENT DOCUMENTS

| | | | |
|---|---|---|---|
| 3,157,630 | 11/1964 | Stephen et al. | 534/803 |
| 3,163,635 | 12/1964 | Riat et al. | 534/803 |
| 3,261,826 | 7/1966 | Andrew | 534/803 |
| 3,843,623 | 10/1974 | Siegel | 534/803 |
| 4,061,627 | 12/1977 | Conrow et al. | 260/178 |
| 4,502,866 | 3/1985 | Brenneisen | 534/803 |

OTHER PUBLICATIONS

Chemical Abstracts, Derwent Publications Ltd., JA 48-167, Nippon Kayaku.

*Primary Examiner*—Josephine Barr
*Attorney, Agent, or Firm*—Cushman, Darby & Cushman

[57] ABSTRACT

A water-soluble dye, free from cellulose reactive groups, of the formula:

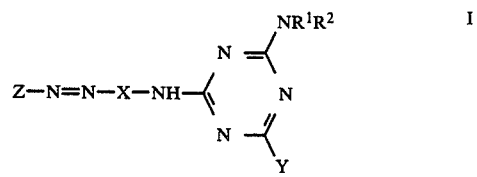

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
X is the residue of a diazotisable amine
Y is $NR^1R^2$ or non-chromophoric groups $OR^3$ or $NR^3R^4$ in which $R^3$ and $R^4$ are independently selected from H, alkyl and aryl, and
Z is:

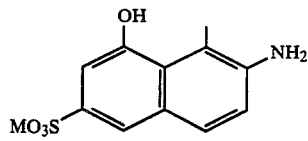

wherein M is a monovalent cation, and an ink containing the dye suitable for use in an ink jet printing process.

10 Claims, 1 Drawing Sheet

WATER-SOLUBLE NON-REACTIVE TRIAZINYL MONO-AZO DYE FOR INK JET PRINTING

This specification describes an invention relating to a water-soluble dye and to an ink containing the dye which is suitable for use in ink jet printing.

According to the present invention there is provided a water-soluble dye, free from cellulose reactive groups, of the formula:

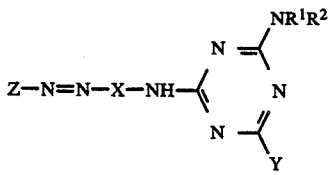

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ & $R^2$ together with the nitrogen atom form a morpholine ring
a & b are different and from 1 to 8
m is from 1 to 10;
n is from 0 to 9;
X is the residue of a diazotisable amine
Y is $NR^1R^2$ or non-chromophoric groups $OR^3$ or $NR^3R^4$ in which $R^3$ and $R^4$ are independently selected from H, alkyl and aryl, and
Z is:

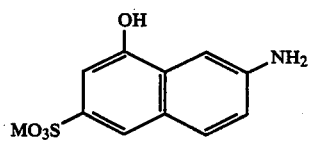

wherein M is a monovalent cation.

Throughout this specification the alkyl groups are preferably $C_{1-4}$-alkyl, preferred cycloalkyl groups are $C_{4-8}$-cycloalkyl, especially cyclohexyl, and the aryl and heteroaryl groups are preferably mono- or bi-cyclic such as phenyl, naphthyl, pyridyl, thiazolyl, thienyl, quinolyl and benzthiazolyl. Substituents for the aryl and heteroaryl groups are preferably $SO_3M$, COOM, OH, $NH_2$, $NH_2CO-$, $CF_3$, $C_{1-4}$-alkyl, $C_{1-4}$-alkoxy, mono- or di-$C_{1-4}$-alkylamino, $C_{1-4}$-alkylcarbonylamino, mono- and di-alkylamino-carbonyl and sulphonyl, ureido, phenylamino, nitro, cyano and halogen, especially chlorine.

If the dye contains more than one $-(C_aH_{2a}O)_m(C_bH_{2b}O)_nH$ group these may be different, but are preferably identical. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)propyl. It is especially preferred that $R^1$ is hydroxyethyl and $R^2$ is H; $R^1$ and $R^2$ are both hydroxyethyl or $NR^1R^2$ is morpholino.

The residue of the diazotisable amine represented by X is preferably derived from aromatic amines of the formulae:

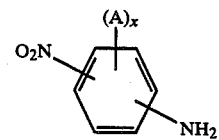

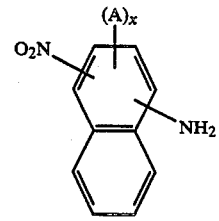

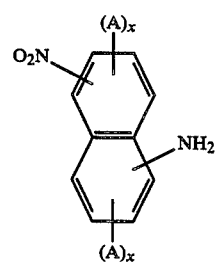

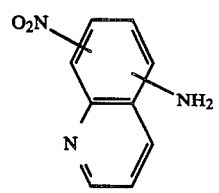

wherein
A is selected from $SO_3M$, COOM, $C_{1-4}$-alkyl, $C_{1-4}$-alkoxy, $C_{1-4}$alkylcarbonylamino, nitro, cyano, halogen, especially chlorine, and hydroxy; and
x is from 1 to 3, preferably 1 or 2;
or from heteroaromatic amines of the formulae:

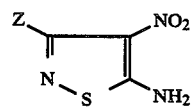

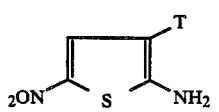

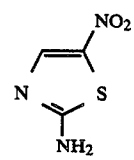

wherein
Z is H or alkyl; and
T is $COOC_{1-4}$-alkyl, $CONH_2$ or CN.

Preferred aromatic amines from which X is derivable are 3- or 4-nitroanilines, nitronaphthylamines, monoacylated diaminonaphthalenes, nitroaminoquinolines, nitroaminobenzthiazoles, nitroaminobenzthiadiazoles and nitroaminobenzimidazoles, optionally carrying one or two other substituents. Examples of 4-nitroanilines (4-NA), 3-nitro-anilines (3-NA) and dinitroanilines (DNA) of Formula (i) from which X is derivable are 2-hydroxy-4-NA, 2-acetyl-4-NA, 2-chloro-4-NA, 2-cyano-4-NA, 2,4-DNA, 2-carboxy-4-NA, 2-(methylaminosulphonyl)-4-NA, 2-methyl-5-methoxy-4-NA, 2-methyl-4-NA, 2-methoxy-4-NA, 2-trifluoromethyl-4-NA, 2-sulpho-4-NA, 2,5-dimethoxy-4-NA, 2,5-dimethyl-4-NA, 2,5-dichloro-4-NA, 5-trifluoromethyl-2,4-DNA, 5-chloro-2,4-DNA, 2-methoxy-5-chloro-4-NA, 2-carboxy-5-chloro-4-NA, 2-methoxy-5-sulpho-4-NA, 4,6-dichloro-3-NA, 4,6-dimethyl-3-NA, 6-methyl-3-NA, 6-methoxy-3-NA, 2,5-DNA, 6-(dimethylamino)-3-NA, 6-(methylamino)-3-NA, 4-methyl-6-methoxy-3-NA, 6-carboxy-3-NA, 4-methoxy-6-carboxy-3-NA, 6-sulpho-3-NA, 4-sulpho-3-NA, 4-chloro-6-sulpho-3-NA, and 4-sulpho-6-methyl-3-NA. Examples of nitronaphthylamines and acylaminonaphthylamines of Formulae (ii) and (iii) from which X is derivable are 3-amino-7-nitro-naphthalene-1,5-disulphonic acid, 1-amino-4-nitronaphthalene-7-sulphonic acid, 2-amino-5-nitronaphthalene, 1-amino-5-nitronaphthalene and 3-amino-7-acylamino-1,5-disulphonic acid. Examples of nitroaminoquinolines of Formula (iv) and the other bicyclic aromatic amines containing heteroatoms from which X is derivable are 5-amino-6-nitroquinoline, 2-methyl-4-amino-6-(3-nitrophenylcarbonylamino)-quinoline, 5-nitro-6-aminoquinoline, 4-amino-6-nitroquinoline, 5-amino-8-nitroquinoline, 5-nitro-8-aminoquinoline, 2-methyl-4-nitro-5-aminobenz-3-thi-1-azole, 4-amino-7-nitro-benz-2-thia-1,3-diazole and 5-nitro-7-aminobenz-1,2-imidazolin-3-one. Examples of the heterocyclic amines of Formulae (v), (vi) and (vii) from which X is derivable are 2-amino-5-nitrothiazole, 2-amino-3-ethoxycarbonyl-5-nitrothiophene, 2-amino-3-cyano-5-nitrothiophene and 2-amino-3-aminocarbonyl-5-nitrothiophene.

Where Y is $NR^1R^2$ the two $NR^1R^2$ groups are preferably identical. Where Y is $OR^3$ or $NR^3R^4$, $R^3$ is preferably H or $C_{1-4}$-alkyl and $R^4$ is preferably selected from H, $C_{4-8}$-cycloalkyl, mono- or bi-cyclic heteroaryl and especially mono- or bi-cyclic aryl. Where $R^4$ is aryl, it is preferably a phenyl or naphthyl group preferably carrying at least one sulphonic acid group, $SO_3M$, and optionally carrying other substituents as hereinbefore described.

Examples of groups represented by Y are hydroxyethylamino, di(hydroxyethyl)amino, morpholino, $NH_2$, $OCH_3$, 3-sulpho-4-nitrophenylamino, 3-sulphophenylamino, 3,5-disulphophenylamino, 2,5-disulphophenylamino, 2-sulpho-4-methylphenylamino, 2-sulpho-5-methylphenylamino, 2-methyl-5-sulphophenylamino, diethylamino.

Water-solubility is enhanced by the presence of acid groups such as carboxylic acid and sulphonic acid groups and also by groups represented by $NR^1R^2$, especially where $R^1$ and/or $R^2$ is hydroxyethyl or $NR^1R^2$ is morpholino. It is preferred that the dye carries at least three such water-solubilising groups. However, sulphonic acid groups are generally superior to carboxylic acid groups at confering water-solubility and it is preferred that the dye carries at least two sulphonic acid groups.

The species M, associated with the acid groups, may be any monovalent cation which forms a stable water-soluble salt with the dye and is preferably ammonium, including substituted ammonium, e.g. mono- di-, tri and quaternary alkyl- or substituted alkyl-ammonium, or an alkali metal, such as sodium, potassium or lithium.

In the following examples of specific dyes in accordance with the present invention the numbering of positions in substituted phenyl groups represented by X is with respect to the azo link.

Dye 1: A dye of Formula I wherein $R^1$ is hydroxyethyl, $R^2$ is H, Y is $NR^3R^4$ in which $R^3$ is is H and $R^4$ is 3-sulphophenyl and X is 2-methyl-5-methoxyphen-1,4-ylene.

Dye 2: A dye of Formula I wherein $R^1$, $R^2$ and Y are as in Dye 1 and X is 2-methoxyphen-1,4-ylene.

Dye 3: A dye of Formula I wherein $R^1$, $R^2$ and Y are as in Dye 1 and X is 2-trifluoromethylphen-1,4-ylene.

Dye 4: A dye of Formula I wherein $R^1$, $R^2$ and Y are as in Dye 1 and X is 2-sulphophen-1,4-ylene.

Dye 5: A dye of Formula I wherein $R^1$ and $R^3$ are as in Dye 1, $R^2$ is hydroxyethyl, $R^4$ is 3-sulpho-4-nitrophenyl and X is 2-methylphen-1,4-ylene.

Dye 6: A dye of Formula I wherein $R^2$, X and Y are as in Dye 1 and $R^1$ is 6-hydroxy-n-hexyl.

Dye 7: A dye of Formula I wherein $NR^1R^2$ and Y are hydroxyethylamino and X is 2-nitrophen-1,4-ylene.

Dye 8: A dye of Formula I wherein $R^1$ and $R^2$ are hydroxyethyl, Y is 3-sulphophenylamino and X is 2-carboxyphen-1,4-ylene.

Dye 9: A dye of Formula I wherein $NR^1R^2$ and Y are morpholino and X is 2-chloro-5-methylphen-1,4-ylene.

Dye 10: A dye of Formula I wherein $R^1$, $R^2$ and Y are as in Dye 8 and X is 2-methoxy-5-sulphophen-1,4-ylene.

Dye 11: A dye of Formula I wherein $R^1$ and $R^2$ are as in Dye 1, Y is 2,5-disulphophenylamino and X is 2,5-dichlorophen-1,4-ylene.

Dye 12: A dye of Formula I wherein $NR^1R^2$ and Y are as in Dye 7 and X is 2,4-dichlorophen-1,5-ylene.

Dye 13: A dye of Formula I wherein $R^1$ and $R^2$ are as in Dye 1, Y is 2,4-disulphophenylamino and X is 2-methylaminophen-1,5-ylene.

Dye 14: A dye of Formula I wherein $NR^1R^2$ is morpholino, Y is 4-sulphophenylamino and X is 2-methyl-4-sulphophen-1,5-ylene.

Dye 15: A dye of Formula I wherein $NR^1R^2$ is hydroxyethylamino, Y is methoxy and X is 4,8-disulphonaphth-2,6-ylene.

Dye 16: A dye of Formula I wherein $NR^1R^2$ is dihydroxyethylamino, Y is 3-sulphophenylamino and X is 6-sulphonaphth-1,4-ylene which is joined to the azo link at the 1-position.

Dye 17: A dye of Formula I wherein $NR^1R^2$ is as in Dye 15, Y is 2,5-disulphophenylamino and X is qinol-5,8-ylene which is joined to the azo link at the 5-position.

Dye 18: A dye of Formula I wherein $NR^1R^2$ is as in Dye 16, Y is 2,4-disulphophenylamino and X is thiazol-2,4-ylene which is joined to the azo link at the 2-position.

The present dye is conveniently prepared by diazotisation of an optionally substituted nitroaniline, preferably a 4-nitroaniline, coupling this with Gamma acid under acid conditions, reducing the nitro group on the diazo component to an amino group, condensing this with one chlorine atom of a dichlorotriazine of the formula:

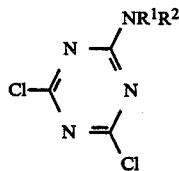

wherein $R^1$ and $R^2$ are as defined in Formula I and substitution of the second chlorine atom with a group, Y, by reaction with a compound Y-H, wherein Y is as defined in Formula I.

Alternatively the present dye may be prepared from an optionally substituted aminoaniline either, (i) by condensation of one amino group with one chlorine atom of a dichlorotriazine of Formula II followed by diazotisation of the other amino group and coupling, under acid conditions, with Gamma acid, or (ii) by protection of one amino group with an acetyl group, diazotisation of the other amino group and coupling, under acid conditions, with Gamma acid followed by hydrolysis of the acetylamino group and condensation of the free amino group with one chlorine atoms of a dichlorotriazine of Formula II. In each case the second chlorine atom on the triazine is replaced by a group, Y, as described above.

The present dyes have particularly good properties in relation to the their use in the preparation of inks, including good lightfastness and solubility in ink media, especially aqueous and water-miscible media as hereinafter described.

The invention with respect to the dye is further illustrated by the following examples in which all parts and percentages are by weight unless otherwise indicated.

EXAMPLE 1

Stage 1

2-Methyl-5-methoxy-4-nitroaniline (18.2 g, 0.1M) was dissolved in glacial acetic acid (200 ml) at 50° C. Hydrochloric acid was added (36%, 50 ml) followed by ice (150 g) and the resulting temperature was 5° C. Sodium nitrite solution (2N, 50 ml) was added gradually at 5° C. and the mixture stirred 10 minutes. Sulphamic acid solution (10%) was added in order to remove excess nitrous acid.

Gamma acid (21.3 g, 0.09M) was dissolved in water (1 liter) at 40° C. and 32% sodium hydroxide solution at pH 9.0. Ice (500 g) was then added and the pH adjusted to 5.0 by the addition of glacial acetic acid. To this suspension at 5° C. was added the above diazo solution and the mixture stirred for 3 hours at 5° C. and then 18 hours at room temperature.

Sodium chloride (10% w/v) was added and the precipitated dye collected by filtration and washed with sodium chloride solution (10%, 200 ml). The dye obtained is of Formula A:

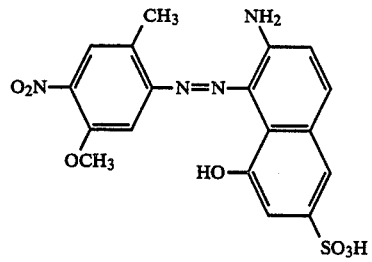

Stage 2

The paste from Stage 1 was stirred in water (1.51) at 50° C. and sodium hydroxide (32%) added to pH 7.0 followed by a solution of sodium sulphide crystals (20 g) in water (100 ml). The reaction mixture was held at 50° C. for 1 hour and then further sodium sulphide (10 g) dissolved in water (100 ml) added and the reaction continued a further ½ hour at 50° C. until complete.

Sodium chloride (75 g) was added to the solution (1.51) at 50° C. and the product collected by filtration and washed with sodium chloride solution (5%, 5×100 ml). The filter cake was stirred in acetone (11) and the suspension filtered, the solid washed with acetone and then dried (15.7 g). The product obtained is of Formula (B):

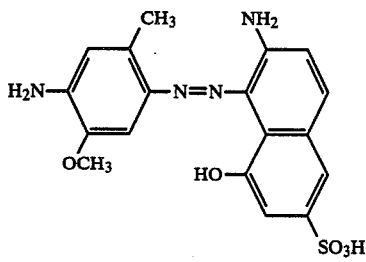

Stage 3

A neutral solution of metanilic acid (4.4 g, 0.025M) in water (150 ml) was added dropwise over 10 minutes to a suspension of cyanuric chloride (4.6 g, 0.025M) in acetone (50 ml) and a mixture of ice and water (300 g). The pH was maintained at 6–7 with sodium hydroxide (8% solution) and 0°–5° C. throughout the addition. The mixture was stirred a further 10 minutes at neutral pH and a solution was obtained.

A neutral solution of the amino azo precursor of Formula B (8.5 g, 0.02M) was prepaed in water (400 ml) at 40° C. The above solution of dichlorotriazinyl metanilic acid was then added and the mixture stirred at 35°–40° C. and pH 6–7 for 2 hours using sodium hydroxide (8% solution) to control the pH.

Potassium acetate (90 g, 10% w/v) was added to the solution (900 ml) at 40° C. The precipitated colour was collected by filtration, washed with ethanol and acetone and then dried (12.5 g). The product is of Formula C:

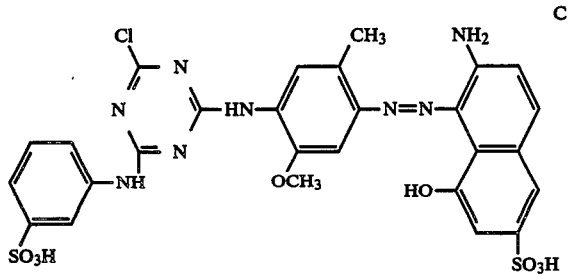

C

Stage 4

The product Formula C (11.5 g, 0.014M) was dissolved in water (200 ml) at pH 8.5 and ethanolamine (5 g) added. The mixture was heated to 70°–75° C. for 7 hours and cooled to room temperature. Hydrochloric acid (36%, 5 ml) was added to obtain a pH value of 6.6 followed by potassium acetate (25 g) and ethanol (400 ml). The solid was collected by filtration, washed with ethanol and dried at 45°–50° C. The dye was redissolved in water (200 cml) and the solution subjected to dialysis. The resulting solution, free from inorganic compounds, was evaporated to dryness at 50°–60° C. in vacuum to yield the magenta dye (8.2 g) of Formula D in which $A^1=CH_3$ and $A^2=OCH_3$.

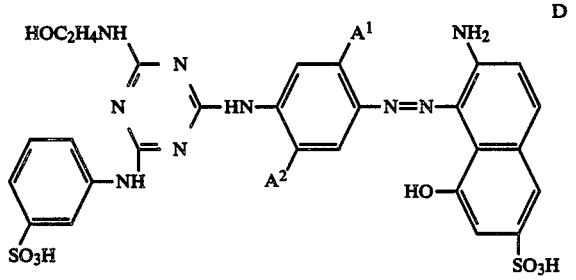

D

EXAMPLE 2

The product of Formula D in Example 1 in which $A^1=OCH_3$ and $A^2=H$ was prepared by the method of Example 1 using an equivalent amount of 2-methoxy-4-nitroaniline in place of the 2-methyl-5-methoxy-4-nitroaniline.

EXAMPLE 3

The product of Formula D in Example 1 in which $A^1=CF_3$ and $A^2=H$ was prepared by the method of Example 1 using an equivalent amount of 2-trifluoromethyl-4-nitroaniline in place of the 2-methyl-5-methoxy-4-nitroaniline.

EXAMPLE 4

The product of Formula D in Example 1 in which $A^1=SO_3H$ and $A^2=H$ was prepared by the method of Example 1 using an equivalent amount of 2-sulpho-4-nitroaniline in place of the 2-methyl-5-methoxy-4-nitroaniline.

The water-soluble dyes of the present invention are adapted for use in inks, particularly writing and printing inks based upon water and/or water-miscible organic solvents, such as alkanols and glycols, and especially inks suitable for ink-jet printing wherein the ink is ejected from an orifice of a recording head in the form of liquid droplets.

For recording on paper or the like with writing tools (fountain pen, felt pen, etc.) it is conventional to use inks which are solutions of dyes in water or a water miscible organic solvent and inks of similar composition are also used in ink-jet printing.

In ink-jet printing, droplets of ink are generated in various ways and deposited on a substrate to effect a record. Suitable inks comprise, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

Figure 1:
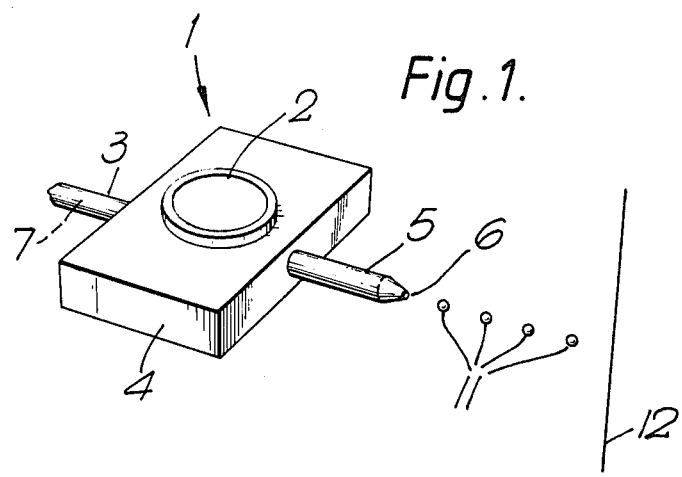
FIGS. 1 and 2 depict devices for generating ink droplets from a signal generated by a piezoelectric oscillator.

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
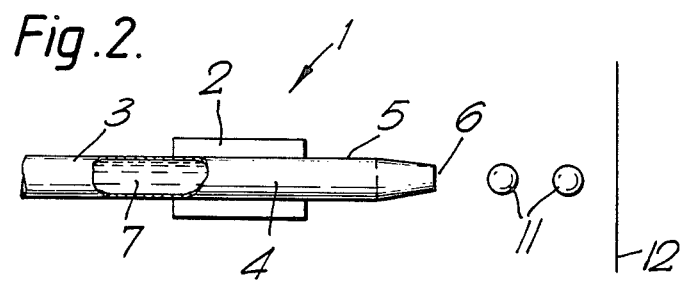

An example of another type of device using the same system is shown in FIG. 2, in which a tubular liquid chamber 4 links the inlet and outlet lines 3, 5 and a cylindrical piezoelectric oscillator 2 is arranged around the uter peripheral portion of the chamber 4. The mechanism for generation of ink droplets is essentially the same as in the device shown in FIG. 1.

In another system, charged droplets are continuously generated but only a proportion of the droplets are selected for recording.

Figure 3:
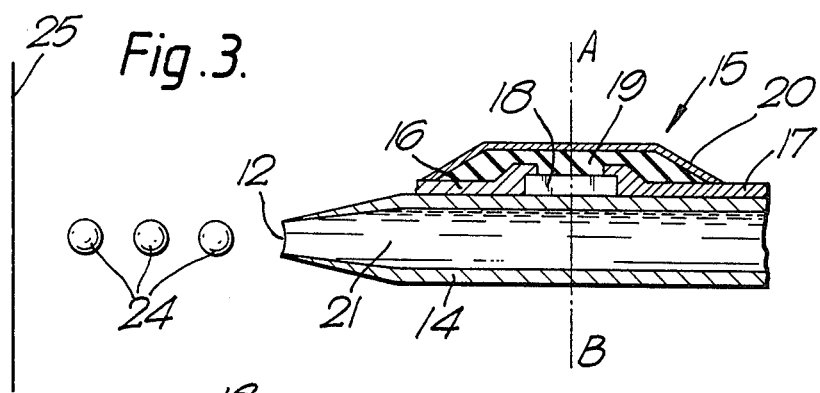
FIGS. 3 and 4 depict devices for generating ink droplets from a signal generated by heat energy corresponding to the pattern.
Figure 4:
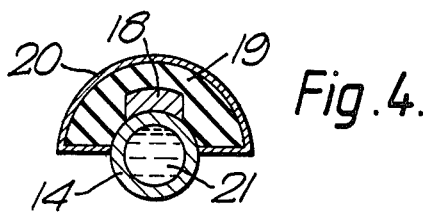

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

Inks for any of various types of ink-jet printing systems need to meet the following criteria:

(1) Physical properties of the ink, such as viscosity and surface tension, are each within a defined range.

(2) All solutes have good solubility in the ink medium to give solutions having good stability which do not plug the fine ejecting orifices (hereinafter referred to as "solution stability").

(3) The recording agent gives images of sufficient optical density.

(4) The ink does not change in physical properties or deposit solid matter during storage.

(5) Printing can be performed without a restriction on the nature of substrate on which a record is made.

(6) The ink exhibits a high rate of fixation.

(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, inks for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye in accordance with Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having exceptionally good water resistance, good alcohol resistance and good light fastness.

The present ink preferably comprises the dye and a liquid medium, such as water, an organic solvent or a mixture thereof. The dye of the first feature of the present invention has especially good solution stability in the above-mentioned liquid media, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

In addition to dye of Formula I, the present ink may contain other dyes selected from various types of known dyes such as direct dyes, acid dyes, and the like but preferably contain only dyes in accordance with the first aspect of the present invention or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$-alkylene groups such as ethylene glycol, propylene glycol, butylene glycol triethylene glycol, thiodiglycol, hexylene glycol and diethylene glycol; other polyols such as glycerol, 1,2,6-hexanetriol; and lower alkyl ethers of polyhydric alcohols such as 2-methoxyethanol, 2-(2-methoxyethoxy)-ethanol, 2-(2-ethoxyethoxy)-ethanol, 2-(2-[2-methoxyethoxy]-ethoxy)-ethanol and 2-[2-(2-ethoxyethoxy)ethoxy]ethanol.

Preferred water-soluble organic solvents among these are glycols and glycol-ethers such as ethylene glycol, diethylene glycol, triethylene glycol and 2-methoxy-2-ethoxy-2-ethoxyethanol, polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture od water, diethylene glycol and N-methylpyrrolidone.

The present ink preferably contains from 5–95%, more preferably 10–80%, and especially 20–50%, by weight of the water soluble organic solvent based on the total weight of the ink.

Examples of specific inks in accordance with the second aspect of the invention are:

| Ink | Dye No. (parts) | Liquid medium and other components (parts) |
| --- | --- | --- |
| 1 | 1 (5) | Water (62) |
|  |  | Ethylene glycol (39) |

-continued

| Ink | Dye No. (parts) | Liquid medium and other components (parts) |
|---|---|---|
| 2 | 2 (4) | 1,2,6-Hexanetriol (5)<br>Water (61)<br>Glycerol (25)<br>Triethanolamine (10) |
| 3 | 3 (4) | Water (67)<br>Diethylene glycol (30)<br>Methyl p-hydroxybenzoate (0.1) |
| 4 | 4 (5) | Water (68)<br>2-Methoxy-2-ethoxy2-ethoxyethanol (30)<br>Polyoxyethylated 4-nonylphenol (0.1) |
| 5 | 1 (6) | Water (72)<br>Propylene glycol (20)<br>Dimethylformamide (5) |
| 6 | 2 (4) | Water (57)<br>Ethyl alcohol (10)<br>Glycerol (30)<br>Sodium dehydroacetate (0.1) |
| 7 | 3 (5) | Water (55)<br>Ethylene glycol (35)<br>1,2,6-Hexanetriol (5) |
| 8 | 4 (3) | Water (41)<br>Triethylene glycol (30)<br>2-Methoxy-2-ethoxy-2-ethoxyethanol (25) |
| 9 | 1 (5) | Water (73)<br>Glycerol (20)<br>Triethanolamine (5) |
| 10 | 2 (4) | Water (57)<br>Triethylene glycol (35)<br>Thiodiglycol (5) |
| 11 | 3 (4) | Water (76)<br>Ethylene glycol(29)<br>Lithium chloride (1) |
| 12 | 4 (5) | Water (63)<br>2-Methoxy-2-ethoxy-2-ethoxyethanol (20)<br>Glycerol (10) |
| 13 | 1 (5) | Water (64)<br>Ethylene glycol (30)<br>Polyethylene glycol (MW: 200) (5) |

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-resistivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention in so far as it relates to inks is further illustrated with reference to the following Examples in which all parts and percentages are by weight unless otherwise indicated.

EXAMPLE 5

An ink was prepared, using the Dye 1, as described in Example 1 above, and the following ingredients:

| | |
|---|---|
| Dye 1 | 5 parts |
| Diethylene glycol | 35 parts |
| Deionised water | 60 parts |

The ink was prepared by thorough mixing of the ingredients, filtering the solution under pressure through a Teflon filter (pore size: 1μ) and degassing the filtered ink, in vacuo. The following five characteristics, $T_1$–$T_5$, were measured using a recording apparatus having an on-demand type of recording head (50μ-diameter ejecting orifice, piezo-oscillator driving voltage 60 V, frequency 4 KHz). This ink gave good results in each test.

$T_1$—Prolonged Storage Stability

The ink was sealed in a glass container and stored at $-30°$ C. and at $60°$ C. for 6 months after which period there was no appreciable separation of any insoluble matter or any change in physical properties and colour.

$T_2$—Ejection Stability

The ink was subjected to a continuous recording tests at room temperature, $5°$ C., and $40°$ C. for 24 hours giving high quality images constantly throughout the test period at each temperature.

$T_3$—Ejection Responsiveness

The ink was subjected to intermittent ejection at two-second intervals and ejection after standing for two months and showed stable uniform recording without causing plugging of the orifice.

$T_4$—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
|---|---|
| IJ recording paper type S | Mitsubishi Paper Mills Ltd. |
| IJ recording papar type M | Mitsubishi Paper Mills Ltd. |

EXAMPLE 6

An element for transforming electric energy into thermal energy was prepared on an alumina substrate as follows.

A $SiO_2$ (lower) layer 5μ thick was formed over the alumina substrate by sputtering and a 1000 Å $HfB_2$ layer, as a heat generating resistor layer, and a 3000 Å aluminum layer, as an electrode, were successively laid thereover. A heat generating resistor pattern having size of 50×200μ was formed by selective etching of the aluminum layer. A $SiO_2$ layer 3500 Å thick, as a protective (upper) layer, was then laid thereover. A print head was formed by bonding a glass plate on which grooves 50μ wide and 50μ deep had been engraved onto the $SiO_2$ protective layer in register with the etched pattern on the heat generating resistor. The tip surface of orifice was then polished so that the distance between the tip of heat generating resistor and the tip surface of orifice was 250μ.

The print head was operated by applying printing signals of 40 V×10$^{-5}$ sec rectangular voltage pulses at a cycle of 2×10$^{-4}$ sec. The print head operated normally and without blockage for 160 hours using an ink having the following composition:

| | |
|---|---|
| Dye No 2 (decomp'n temp: 280° C.) | 5 parts |
| Diethylene glycol | 25 parts |
| N—methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye No. 2 with a dye of the formula:

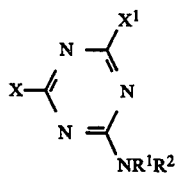

wherein $R^1$ and $R^2$ are both hydroxyethyl, X is:

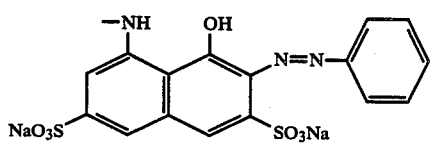

and $X^1$ is:

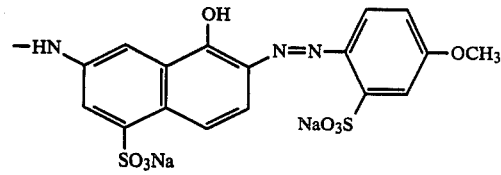

EXAMPLE 7

The print head was operated similarly to Example 6 using inks having the compositions listed in Table 1 in place of the ink containing Dye No. 2, by applying printing signals of 50 V×10$^{-5}$ sec rectangular voltage pulses at a cycle of 2×10$^{-4}$ sec. The resulting satisfactory operating periods are shown in Table 1.

| Composition of ink | | Satisfactory |
|---|---|---|
| Dye No. | Content (wt %) | Operating Period (hours) |
| 1 | 5 | 180 |
| 2 | 4.5 | 170 |
| 3 | 5 | 170 |
| 1 | 6 | 160 |
| 2 | 6 | 150 |

EXAMPLES 8-20

Inks having the compositions defined in Table 2 were prepared and tested for properties $T_1$-$T_5$, in the same manner as in Example 5.

The results indicated that all these inks have good characteristics, and particularly excellent recording performance, fixation properties and sharpness of image.

TABLE 2

| Example | Dye No. (parts) | Liquid medium and other components (parts) |
|---|---|---|
| 8 | 1 (5) | Water (62) |
| | | Ethylene glycol (39) |
| | | 1,2,6-Hexanetriol (5) |
| 9 | 2 (4) | Water (61) |
| | | Glycerol (25) |
| | | Triethanolamine (10) |
| 10 | 3 (4) | Water (67) |
| | | Diethylene glycol (30) |
| | | Methyl p-hydroxybenzoate (0.1) |
| 11 | 1 (6) | Water (72) |
| | | Propylene glycol (20) |
| | | Dimethylformamide (5) |
| 12 | 2 (4) | Water (57) |
| | | Ethyl alcohol (10) |
| | | Glycerol (30) |
| | | Sodium dehydroacetate (0.1) |
| 13 | 3 (5) | Water (55) |
| | | Ethylene glycol (35) |
| | | 1,2,6-Hexanetriol (5) |
| 14 | 1 (5) | Water (73) |
| | | Glycerol (20) |
| | | Triethanolamine (5) |
| 15 | 2 (4) | Water (57) |
| | | Triethylene glycol (35) |
| | | Thiodiglycol (5) |
| 16 | 3 (4) | Water (76) |
| | | Ethylene glycol(29) |
| | | Lithium chloride (1) |
| 17 | 1 (5) | Water (64) |
| | | Ethylene glycol (30) |
| | | Polyethylene glycol (MW: 200) (5) |

EXAMPLE 18

The inks prepared in Examples 5 and 6 were charged separately into commercial fountain pens and records were made on plain paper. The results showed no blotting of image and high rates of absorption of the ink in all the cases.

I claim:

1. A water-soluble dye, free from cellulose reactive groups, of the formula:

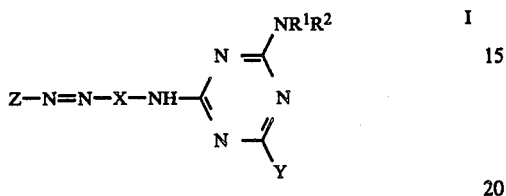

wherein $R^1$ is —$(C_aH_{2a}O)_m(C_bH_{2b}O)_nH$, $R^2$ is H or —$(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

X is the residue of a diazotisable amine

Y is $NR^1R^2$ or non-chromophoric groups $OR^3$ or $NR^3R^4$ in which $R^3$ and $R^4$ are independently selected from H, $C_{1-4}$-alkyl and aryl, and Z is:

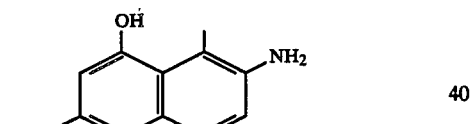

wherein M is a monovalent cation.

2. A dye according to claim 1 wherein $NR^1R^2$ is selected from hydroxyethylamino, di(hydroxyethyl)amino and morpholino.

3. A dye according to claim 1 or claim 2 wherein Y is $NR^1R^2$.

4. A dye according to claim 1 or claim 2 wherein Y is selected from OH, $C_{1-4}$-alkoxy, $NH_2$, $C_{1-4}$-alkylamino, $C_{4-8}$-cycloalkylamino, phenylamino, substituted phenylamino, naphthylamino, substituteed naphthylamino, in which the substituents are selected from $SO_3M$, COOM, OH, $NH_2$, $CF_3$, $NH_2CO$, CN, $NO_2$, $C_{1-4}$-alkyl, $C_{1-4}$-alkoxy, mono- and di-$C_{1-4}$-alkyl-amino, $C_{1-4}$-alkylcarbonylamino, aminocarbonyl, and halogen.

5. A dye according to claim 1 wherein X is the residue of a diazotisable amine selected from:

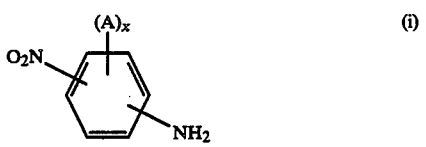

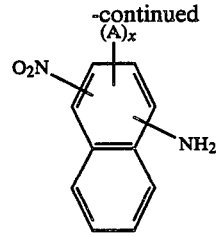

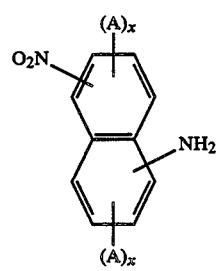

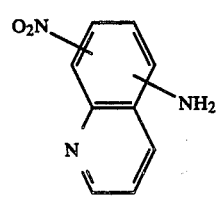

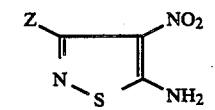

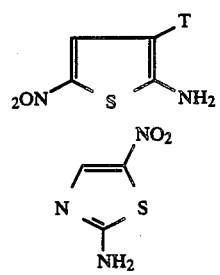

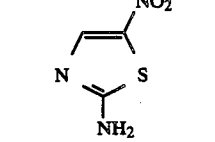

wherein

A is selected from $SO_3M$, COOM, $C_{1-4}$-alkyl, $C_{1-4}$-alkoxy, $C_{1-4}$alkylcarbonylamino, $NO_2$, CN, OH and halogen;

x is from 1 or 2;

Z is H or $C_{1-4}$-alkyl;

T is $COOC_{1-4}$-alkyl, $CONH_2$ or CN.

6. A dye according to claim 1 wherein X is selected from 3-nitroaniline, 4-nitroaniline, nitronaphthylamines, acylamino-aminonaphthalenes, nitroaminoquinolines, nitroaminobenzthiazoles, nitroaminothiazoles, nitroaminobenzthiadiazoles and nitroaminobenzimidazoles optionally substituted by one or two groups selected from $SO_3M$, COOM, OH, $NH_2$, $NH_2CO$—, $CF_3$, $C_{1-4}$-alkyl, $C_{1-4}$-alkoxy, mono- or di-$C_{1-4}$-alkylamino, $C_{1-4}$-alkylcarbonylamino, mono- and dialkylamino-carbonyl and sulphonyl, ureido, phenylamino, nitro, cyano and halogen.

7. A dye according to claim 1 carrying at least three water-solubilising groups selected from $NR^1R^2$, $SO_3M$ and COOM.

8. A dye according to claim 1 wherein $NR^1R^2$ is hydroxyethylamino, X is 2-trifluoromethylphen-1,4-ylene, Y is 3-sulphophenylamino and M is potassium.

9. A dye according to claim 1 wherein $NR^1R^2$, Y and M are as in claim 8 and X is 2-methyl-5-methoxyphen-1,4-ylene.

10. A dye according to claim 1 wherein $NR^1R^2$, Y and M are as in claim 8 and X is 2-methoxyphen-1,4-ylene.

* * * * *